United States Patent [19]
Morikawa

[11] Patent Number: 5,384,098
[45] Date of Patent: Jan. 24, 1995

[54] EXHAUST GAS RECIRCULATION SYSTEM FOR AN ENGINE

[75] Inventor: Koji Morikawa, Tokyo, Japan

[73] Assignee: Fuji Jukogyo Kabushiki Kaisha, Tokyo, Japan

[21] Appl. No.: 114,061

[22] Filed: Aug. 31, 1993

[30] Foreign Application Priority Data

Sep. 24, 1992 [JP] Japan .................. 4-254676

[51] Int. Cl.6 .............. G05D 7/00; F01N 3/00; F01N 7/08
[52] U.S. Cl. .............. 422/111; 60/287; 60/302; 60/324; 422/109; 422/115; 422/177
[58] Field of Search .............. 422/111, 115, 168, 176, 422/177, 109; 423/212, 213.2, 213.7; 60/287, 302, 324

[56] References Cited

U.S. PATENT DOCUMENTS

| | | | |
|---|---|---|---|
| 3,757,521 | 9/1973 | Tourtellotte et al. | 423/213.7 X |
| 3,791,143 | 2/1974 | Keith et al. | 60/274 |
| 3,813,226 | 6/1972 | Heitland et al. | 422/115 |
| 4,244,187 | 1/1981 | Lane et al. | 60/602 |
| 4,817,385 | 4/1989 | Kumagai | 422/115 X |
| 4,926,634 | 5/1990 | Piitz et al. | 60/274 |
| 5,018,349 | 5/1991 | Pemberton | 60/313 |
| 5,140,811 | 8/1992 | Minami et al. | 423/213.7 X |
| 5,143,701 | 9/1992 | Schatz | 422/115 X |
| 5,228,287 | 7/1993 | Kuronishi et al. | 60/276 |
| 5,250,268 | 10/1993 | Geiger | 422/177 X |

FOREIGN PATENT DOCUMENTS 210116 12/1982 Japan .

*Primary Examiner*—Robert J. Warden
*Assistant Examiner*—Robert Carpenter
*Attorney, Agent, or Firm*—Beveridge, DeGrandi Weilacher & Young

[57] ABSTRACT

The exhaust gas purification system for an engine with two banks provides a pair of bypasses for interchangeably communicating with each of the exhaust pipes from the two banks. A changeover valve is inserted at the junction point of the bypass and is inserted at the junction point of the bypass and the exhaust pipe for changing the flow of the exhaust gas. When the catalyst temperature is lower than a predetermined value, the exhaust gas flows directly into the catalyst. When the catalyst temperature is higher than the predetermined value, the exhaust gas flows into the bypasses for cooling the exhaust gas and then into the other side catalyst. Therefore, the activity performance of said catalyst is improved in both cold and hot states.

6 Claims, 3 Drawing Sheets

EXHAUST GAS RECIRCULATION SYSTEM FOR AN ENGINE

BACKGROUND OF THE INVENTION

This invention relates to an exhaust gas purification system for an engine for activation of a catalyst at the time of starting the engine and suppressing deterioration of a catalyst due to influence of exhaust gas heat at a high temperature.

In general, since a catalyst used for an exhaust gas purification system of this type is scarcely activated at a low temperature, the catalyst may be disposed at the upstream position of an exhaust passage so as to produce an activation of the catalyst at the time of starting the engine at a low temperature, but if the catalyst is disposed at the upstream position of the exhaust passage, deterioration of the catalyst is caused by the influence of exhaust gas heat at a high temperature of exhaust at the time of operating the engine at a high load, and a problem arises in its durability.

Therefore, as disclosed, for example, in Japanese Patent Laid-Open Publication No. 210116/1982, there is prior art of technique for enhancing purification ratio of exhaust gas and improving durability by arranging two catalysts at a predetermined interval in an exhaust passage, providing a bypass for bypassing the catalyst at the upstream position, further providing a changeover valve at the inlet side of the catalyst at the upstream position, closing the bypass by the changeover valve when exhaust gas is at low temperature to introduce the exhaust gas to the catalyst at the upstream position, closing the inlet of the catalyst at the upstream position by the changeover valve and introducing the exhaust gas to the catalyst at the downstream position through the bypass when the exhaust gas is at relatively high temperature to cool it through the bypass.

According to the above-described prior art, at least two catalysts are required in the exhaust passage. Particularly, in recent V-type and horizontal type engines for controlling exhaust gas purification at respective banks, at least two catalysts must be provided on one bank, and hence there is a problem in which its cost is expensive.

SUMMARY OF THE INVENTION

An object of this invention is to provide an exhaust gas purification system for an engine which proceeds to activate a catalyst at the time of starting the engine at a low temperature to improve an exhaust emission, prevents deterioration of the catalyst at a high temperature to improve durability of the catalyst and decreases a cost of the product.

In order to achieve the above object, this invention provides an exhaust gas purification system for an engine having, at least two banks of said engine, an intake manifold connected to an intake port provided on said bank (LB, RB) for inducing air-fuel mixture into a cylinder, a pair of exhaust pipes connected to an exhaust port provided on said bank for emitting an exhaust gas from said cylinder, an $O_2$ sensor provided in said exhaust pipe at the downstream position of said exhaust port for detecting an concentration of $O_2$, and a catalyst inserted in said exhaust pipe at the downstream position of said $O_2$ sensor for purifying said exhaust gas, an improvement of the system which comprises a changeover valve provided in said exhaust pipe between said $O_2$ sensor and said exhaust port, a pair of bypasses connected to said exhaust pipes for communicating said exhaust gas each other, an inlet of said bypass provided at an upstream position of said $O_2$ sensor for introducing said exhaust gas to the other exhaust pipes, an outlet of said bypass provided at a position of said $O_2$ sensor for directly sensing said concentration in said exhaust gas from the other exhaust pipes, and said changeover valve is controlled to close said bypass when a temperature of said catalyst is lower than a predetermined value and to open said bypass when said temperature of said catalyst is higher than said predetermined value so as to improve activity of said catalyst in a cold state.

According to the arrangement as described above, the changeover valves inserted to the exhaust pipes close the bypasses when a catalyst temperature is low to introduce exhaust gas directly to the catalyst inserted to the exhaust pipe connected to the bank. As a result, the catalyst is heated by the exhaust gas heat to proceed the activation of the catalyst.

On the other hand, when the catalyst temperature is high, the changeover valve closes one of the inlet of the catalyst to introduce the exhaust gas to the other inlet of the catalyst in the other exhaust pipe through the bypass. Since the exhaust gas is cooled while flowing through the bypass, deterioration of the catalyst at a high temperature is suppressed to improve durability.

The nature, utility, and further features of this invention will be more clearly apparent from the following detailed description with respect to preferred embodiments of the invention when read in conjunction with the accompanying drawings, briefly described below.

DETAILED DESCRIPTION OF THE INVENTION

The embodiments of this invention will be explained with reference to accompanying drawings.

Figure 1:
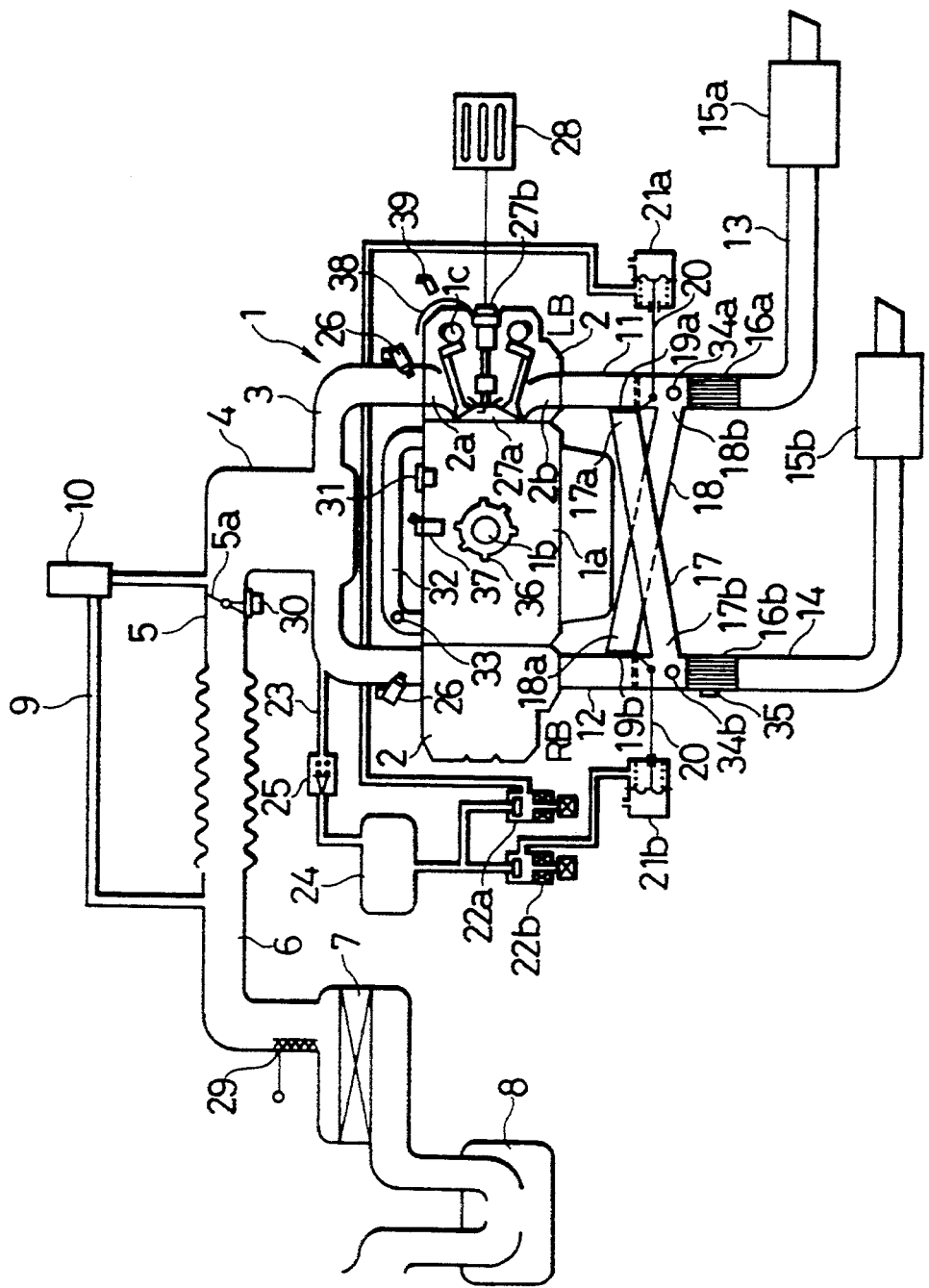
FIG. 1 is an overall view of an engine control system illustrating an embodiment of an exhaust gas purification system for an engine according to this invention.

In FIG. 1, numeral 1 indicates an engine body, a horizontal opposed type engine, for example, in the drawing. An intake port 2a and an exhaust port 2b are formed at cylinder heads 2 provided on left and right banks LB and RB of the engine body 1. An intake manifold 3 is connected to the intake port 2a, and a throttle passage 5 having a throttle valve 5a provided therein is connected at the upstream position of the intake manifold 3 through an air chamber 4. An air cleaner 7 is mounted at the upstream position of the throttle passage 5 through an intake passage 6, and the air cleaner 7 is connected to an air intake chamber 8 of an intake air inlet.

An idle speed control valve (ISCV) 10 is interposed in an air bypass 9 for bypassing the upstream position with the downstream position of the throttle valve 5a.

On the other hand, an L (left) exhaust manifold 11 and an R (right) exhaust manifold 12 are connected on the banks to the exhaust port 2b, an L (left) exhaust pipe 13 and an R (right) exhaust pipe 14 are connected to the exhaust manifolds 11 and 12, and then to mufflers 15a and 15b.

An L catalyst 16a and an R catalyst 16b are respectively interposed at positions near the exhaust ports 2b of the respective banks LB and RB in the exhaust pipes 13 and 14. Inlets 17a and 18a of exhaust bypasses 17 and 18 are connected between the catalysts 16a, 16b of the exhaust passages 13, 14 and the exhaust manifolds 11 and 12. The exhaust bypasses 17 and 18 are extended perpendicularly to each other to the other exhaust pipes 14, 13. The outlets 17b and 18b of the bypasses 17 and 18 are connected between the inlets 18a, 17a of the other bypasses 18, 17 opened with the other exhaust pipes 14, 13 and the catalysts 16b, 16a. Changeover valves 19a, 19b are respectively arranged in the inlets 17a, 18a of the bypasses 17, 18 opened with the exhaust pipes 13, 14. The changeover valves 19a and 19b are respectively cooperatively connected to an L diaphragm actuator 21a and an R diaphragm actuator 21b through a link lever 20. The diaphragm actuators 21a and 21b are respectively partitioned into two chambers by diaphragms in such a manner that a diaphragm spring is mounted in one to form spring chambers connected to a left changeover solenoid valve 22a with the pipe for controlling the left changeover valve and a right changeover solenoid valve 22b with the pipe for controlling the right changeover valve and the other to form an atmospheric chamber communicating with the atmosphere.

The changeover solenoid valves 22a and 22b for controlling the changeover valves selectively communicate the spring chambers of the diaphragm actuators 21a, 21b to an atmosphere port opened with the atmosphere or a negative pressure port for communicating with a negative pressure pipe 23 connected to the intake manifold 3, and are controlled to be switched by a control signal to be output from a controller (ECU) 50 to be described later. A surge tank 24 is inserted in the negative pressure pipe 23, and a check valve 25 to be opened when the negative pressure of the intake manifold 3 is larger than that of the surge tank 24 is inserted therein.

When the spring chambers of the diaphragm actuators 21a and 21b become the atmospheric pressure by the control operation of the changeover solenoid valves 22a and 22b for controlling the changeover valves 19a, 19b, the changeover valves 19a, 19b close the inlets 17a, 18a of the bypasses 17, 18 and open the exhaust pipes 13, 14 communicating with the exhaust manifolds 11, 12 of the banks LB and RB. On the other hand, when the spring chambers of the diaphragm actuators 21a, 21b become negative pressure, the changeover valves 19a, 19b open the inlets 17a, 18a of the bypasses 17, 18 and close the exhaust pipes 13, 14 communicating with the exhaust manifolds 11, 12 of the banks LB and RB.

An injector 26 is disposed directly at the upstream position of the intake port 2a of each cylinder of the intake manifold 3, an ignition plug 27a to be exposed at an end thereof with a combustion chamber is mounted in each cylinder of the cylinder head 2, and an igniter 28 is connected to the ignition coil 27b connected to the ignition plug 27a.

An intake air sensor (a hot wire air flow meter in FIGS. 1 and 2) 29 is disposed directly at a downstream position of the air cleaner 7 of the intake passage 6, and a throttle sensor 30 is connected to the throttle valve 5a. Further, a knock sensor 31 is mounted at the cylinder block 1a of the engine body 1. A coolant temperature sensor 33 is disposed in a coolant passage 32 for connecting both the banks LB and RB of the cylinder block 1a. A left $O_2$ sensor 34a and a right $O_2$ sensor 34b are respectively disposed directly at upstream sides of the catalysts 15a, 16b of the exhaust pipes 13, 14, and a catalyst temperature sensor 35 is provided therewith at the right catalyst 16b.

A crank rotor 36 is supported to a crankshaft 1b supported to the engine body 1, and a crank angle sensor 37 is opposed to the outer periphery of the crank rotor 36. Further, a cam angle sensor 39 is opposed to a cam rotor 38 operatively connected to the cam shaft 1c of the engine body 1. The crank angle sensor 37 and the cam angle sensor 39 are not limited to magnetic sensors such as electromagnetic pickups, but may be optical sensors.

On the other hand, projections (or slits) are formed on the outer peripheries of the crank rotor 36 and the cam rotor 38. The ECU 50 calculates the r.p.m. of the engine and the ignition timing from a period of an interval of pulses for detecting the projections (or slits) from the crank angle sensor 37, and determines the cylinder from an interrupt of the pulse for detecting the protrusion (or slit) from the can angle sensor 39.

Figure 2:
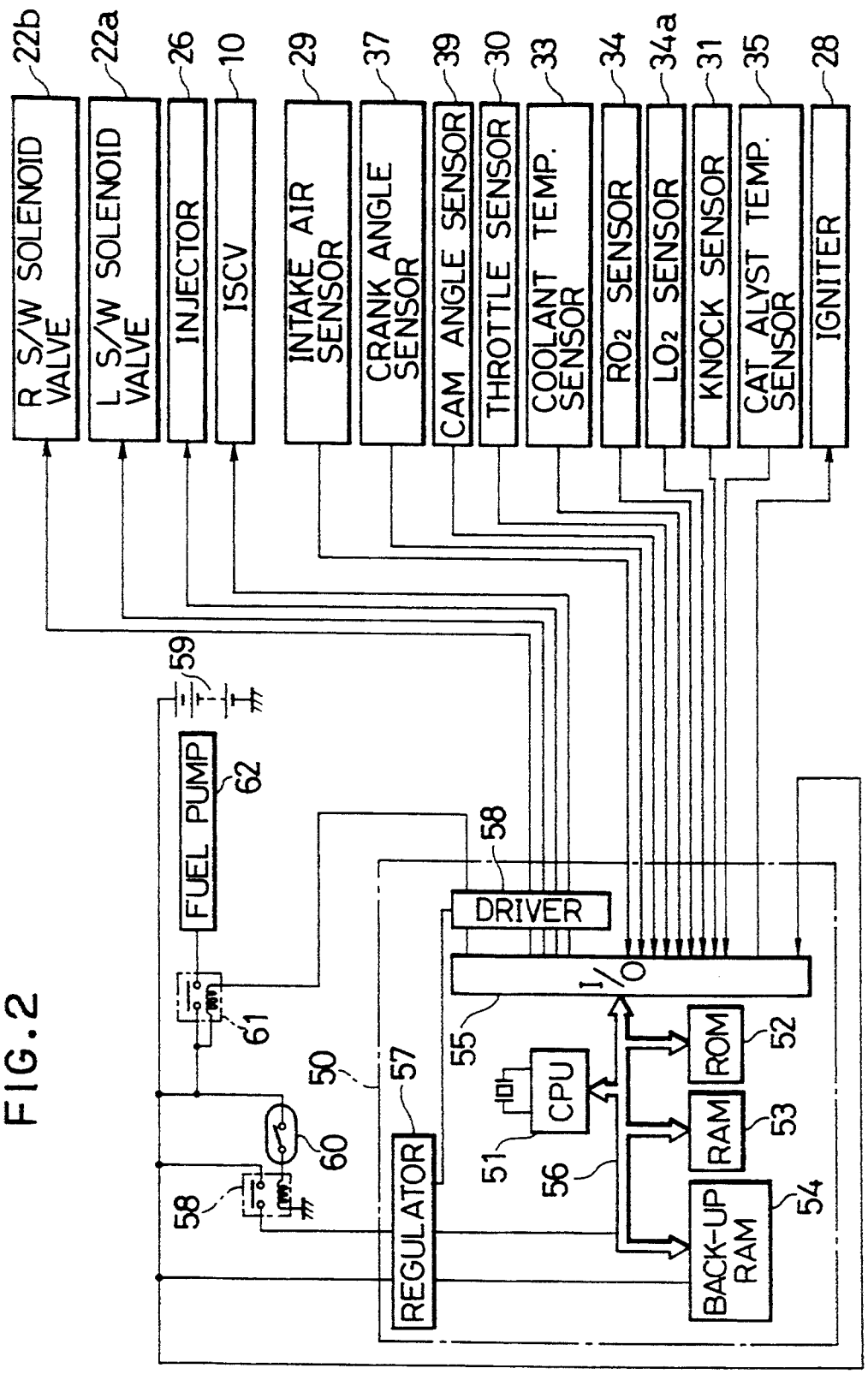
FIG. 2 is a circuit diagram of a controller of the exhaust gas purification system of the invention.

In FIG. 2, numeral 50 designates a controller (ECU) made of a microcomputer, which has a CPU 51, a ROM 52, a RAM 53 a backup RAM 54 and an I/O interface 55 connected through a bus line 56.

A regulator 57 is contained in the ECU 50. The regulator 57 is connected to a battery 59 through a relay contact of an ECU relay or a driver 58. The relay coil of the driver 58 is connected to the battery 59 through an ignition switch 60. When the ignition switch 60 is closed, the contact of the driver 58 is closed, the voltage of the battery 59 is supplied to the regulator 57, and a stabilized voltage is supplied to sections of the ECU 50. On the other hand, a backup voltage is always applied from the regulator 57 to the backup RAM 54. A fuel pump 62 is connected to the battery 59 through a relay contact of a fuel pump relay 61.

The battery 59 is connected to an input port of the I/O interface 55 of the ECU 50 to monitor a battery voltage, and the intake air sensor 29, the crank angle sensor 37, the cam angle sensor 39, the throttle sensor 30, the coolant temperature sensor 33, the right $O_2$ sensor 34b, the left $O_2$ sensor 34a, the knock sensor 31 and the catalyst temperature sensor 35 are connected thereto.

The igniter 28 is connected to the output port of the I/O interface 55, and the right changeover solenoid valve 22b, the left changeover solenoid valve 22a, the injector 26, the ISCV 10 and the relay coil of the fuel pump relay 61 are connected with it through the driver 58.

A control program, various fixed data are stored in the ROM 52. Output signals of the sensors, data-processed and data calculated by the CPU 21 are stored in the RAM 53.

When the ignition switch 60 is closed, the CPU 51 first energizes the fuel pump relay 61 according to the control program stored in the ROM 52 to drive the fuel pump 62, controls a fuel injection amount, an ignition timing, etc., based on the output signals of the sensors, reads the catalyst temperature Tc and controls the changeover operations of both the changeover solenoid valves 22a, 22b.

Figure 3:
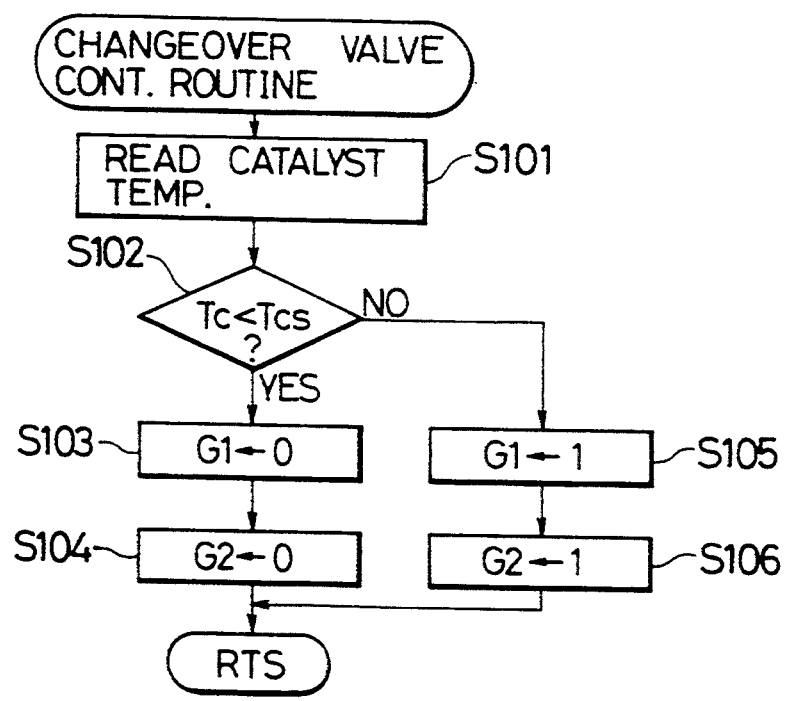
FIG. 3 is a flow chart showing a changeover valve control routine of the embodiment of the invention.

Then, control of the changeover valves by the ECU 50 will be described with reference to a flow chart of FIG. 3.

In the flow chart of FIG. 3, when the ignition switch 60 is closed and power is applied to the ECU 50, at step (hereinafter referred to as "S") 101, by a routine to be executed at each predetermined period of time, a temperature Tc of the right catalyst 16b detected by the catalyst temperature sensor 35 is first read. At S102, the catalyst temperature Tc is compared with a preset active temperature Tcs. In the case of Tc<Tcs, the flow advances to S103, while in the case of Tc≧Tcs, the flow advances to S105.

When the flow advances to S103, an I/O port output value G1 to the exciting coil of the left changeover solenoid valve 22a is set to "0". Then, at S104, an I/O port output value V2 to the exciting coil of the right changeover solenoid valve 22b is set to "0", and the routine is terminated.

When the I/O port output values G1 and G2 to the changeover solenoid valves 22a, 22b become "0", the atmosphere ports of the changeover solenoid valves 22a, 22b are opened to introduce the atmosphere to the spring chambers of the changeover solenoid valves 21a, 21b. The diaphragm actuators 21a, 21b retract the link lever 20 by the energizing force of the diaphragm spring. Thus, the changeover valves 19a, 19b operatively connected to the link lever 20 close the inlets 17a, 17b of the bypasses 17, 18 and open the exhaust pipes 13, 14 connected to the exhaust manifolds 11, 12 of both the banks LB and RB of the engine body 1 (as indicated by a solid line in the drawing). As a result, since the exhaust gases discharged from the exhaust ports 2b of the banks LB and. RB flow to the catalysts 16a, 16b disposed at a near distance directly at the downstream position, the temperatures of the catalysts 16a, 16b immediately rise by the exhaust gas heat to fasten the activation of the catalysts 16a, 16b, thereby enhancing the exhaust purification ratio thereby to improve an exhaust emission.

On the other hand, in the case of Tc≧Tcs, the flow advances to S105, the I/O port output value G1 to the exciting coil of the left changeover solenoid valve 22a is set to "1". Then, at S106, the I/O port output value G2 to the exciting coil of the right changeover solenoid valve 22b is set to "1", and the routine is terminated.

When the I/O port output values G1 and G2 to the changeover solenoid valves 22a, 22b become "1", the negative pressure ports of the changeover solenoid valves 22a, 22b are opened to introduce the negative pressure from the intake manifold 3 into the spring chambers of the diaphragm actuators 21a, 21b through the surge tank 24. As a result, the diaphragms 21a, 21b project the link lever 20 against the energizing forces of the diaphragm springs, the changeover valves 19a, 19b operatively connected to the link lever 20 open the inlets 17a, 18b of the bypasses 17, 18 and close directly at the downstream positions of the inlets 17a, 18a of the exhaust pipes 13, 14 (as indicated by two-dotted broken lines in the drawings).

Then, the exhaust gas is introduced from the exhaust manifolds 11, 12 operatively connected to the exhaust ports 2b of both the banks LB and RB to the other exhaust pipes 14, 13 by bypassing the exhaust bypasses 17, 18, and fed to the catalysts 16b, 16a disposed in the exhaust pipes 14, 13. As a result, since the exhaust gas is cooled while flowing through the bypasses 17, 18, the temperatures of the catalysts 16a, 16b are not abnormally raised to prevent deterioration and damage of the catalysts.

This invention is not limited to the particular embodiment described above. For example, the changeover valves 19a, 19b are linked, and the changeover operations of both the changeover valves 19a, 19b may be controlled by one actuator.

In the embodiment described above, the catalyst temperature is detected directly by the catalyst temperature sensor. However, the catalyst temperature may be estimated based on the operating state of the engine. For example, when a load is high or an air-fuel ratio is lean in a state that a coolant temperature is higher than a set value in an engine warm-up complete state, the catalyst temperature becomes high and hence the catalyst temperature can be estimated according to the conditions. The high load state may be judged according to whether a basic fuel injection amount Tp (a value to be determined according to an intake air amount or an intake manifold negative pressure and r.p.m. of the engine) representing the load state, a fuel injection amount Ti (a value obtained by correcting the basic fuel injection amount Tp by various correction items), and a throttle opening or an intake air amount per one stroke are set values or more or not.

In the embodiment described above, the exhaust pipes 13, 14 and the mufflers 15a, 15b are independently provided at the downstream positions of the catalysts 16a, 16b. However, this invention is not limited to the particular embodiment. For example, the exhaust pipes may be combined at the downstream positions of the catalysts 16a, 16b and one muffler may be disposed at the downstream position of the joint of the pipes.

Control of air-fuel ratio when the exhaust gas from one bank LB (RB) is introduced to the catalyst 16b (16a) of the other bank RB (LB) is improved if an air-fuel ratio feedback correction coefficient of the bank LB (RB) side is set based on the detected value of the O₂ sensor 34b (34a).

According to the present invention as described above, when the catalyst temperature is low, the exhaust gas at a high temperature is introduced to the catalyst. Therefore, the activation of the catalyst proceeds to enhance the exhaust purification ratio, thereby improving an exhaust emission at the time of starting the engine at a low temperature.

If the temperature of the catalyst is high, the exhaust gas cooled through the bypass is introduced to the catalyst. Therefore, deterioration and damage of the catalyst at the high temperature are suppressed to improve durability.

Further, since it is not necessary to increase the number of the catalysts, a decrease in the cost of the product can be realized.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. An exhaust gas purification system for an engine comprising a pair of exhaust pipes connected to an exhaust port provided on engine banks for emitting an exhaust gas from an engine cylinder, an oxygen sensor provided in said exhaust pipes at a downstream position of said exhaust port for detecting a concentration of oxygen, and a catalyst inserted into each of said exhaust pipes at said downstream position of said oxygen sensor for purifying said exhaust gas;

a changeover valve provided in said exhaust pipes between said oxygen sensor and said exhaust port;

a pair of bypasses connected to said exhaust pipes for conveying said exhaust gas from one of said exhaust pipes to another of said exhaust pipes;

an inlet of one of said bypasses provided at a position upstream of said oxygen sensor for introducing said exhaust gas to the other of said exhaust pipes;

an outlet of said one of said bypasses provided at a position of said oxygen sensor for directly sensing said concentration in said exhaust gas in said other of said exhaust pipes; and control means operatively connected to said changeover valve for closing said bypass when a temperature of said catalyst detected by a temperature sensor is lower than a predetermined value and for opening said bypass when said temperature of said catalyst detected by said temperature sensor is higher than said predetermined value so as to improve activity of said catalyst in a cold state.

2. An exhaust gas purification system for an internal combustion engine comprising a pair of exhaust pipes connected to an exhaust port provided on a set of engine cylinders for emitting exhaust gas from each cylinder, an oxygen sensor provided in each of said exhaust pipes at a downstream position from said exhaust port for detecting a concentration of oxygen, and a catalyst inserted in each of said exhaust pipes at said downstream position of said oxygen sensor for purifying said exhaust gas;

a pair of bypasses for connecting one of said exhaust pipes and the other of said exhaust pipes in position between said exhaust port and said catalyst;

an inlet of each of said bypasses provided at a position upstream of said oxygen sensor for introducing said exhaust gas to the other of said exhaust pipes;

an outlet of said bypass provided at the position of said oxygen sensor for directly sensing said concentration of oxygen in said exhaust gas from the other of said exhaust pipes; and a changeover valve provided in each of said exhaust pipes at a junction of each of said exhaust pipes and said inlet of each of said bypasses to changeover the exhaust gas flow between said exhaust pipes through said bypasses.

3. The exhaust gas purification system according to claim 2, wherein said engine has a pair of intake manifold connected to each intake port provided on one of said set of cylinders.

4. The exhaust gas purification system according to claim 2, wherein said engine has at least two banks and each of said set of cylinder is provided in each bank of said engine.

5. The exhaust gas purification system according to claim 2, further comprising:

detecting means for detecting a condition of said exhaust gas; and control means responsive to said detecting means for controlling the changeover valve to close each of said bypasses when a temperature of said catalyst is lower than a predetermined value and to open each of said bypasses when said temperature of said catalyst is higher than said predetermined value so as to improve activity of said catalyst in a cold state and to enhance durability of said catalyst in a hot state.

6. A combination comprising an engine having at least two banks of said engine, an intake manifold connected to an intake port provided on said banks for inducing an air-fuel mixture into a cylinder, a pair of exhaust pipes connected to an exhaust port provided on said banks for emitting an exhaust gas from said cylinder, an oxygen sensor provided in said exhaust pipes at a downstream position of said exhaust port for detecting a concentration of oxygen, and a catalyst inserted into each of said exhaust pipes at said downstream position of said oxygen sensor for purifying said exhaust gas, a changeover valve provided in said exhaust pipes between said oxygen sensor and said exhaust port, a pair of bypasses connected to said exhaust pipes for conveying said exhaust gas from one of said exhaust pipes to another of said exhaust pipes, an inlet of one of said bypasses provided at a position upstream of said oxygen sensor for introducing said exhaust gas to the other of said exhaust pipes, an outlet of said one of said bypasses provided at a position of said oxygen sensor for directly sensing said concentration in said exhaust gas in said other of said exhaust pipes, and control means operatively connected to said changeover valve for closing said bypass when a temperature of said catalyst detected by a temperature sensor is lower than a predetermined value and for opening said bypass when said temperature of said catalyst detected by said temperature sensor is higher than said predetermined value so as to improve activity of said catalyst in a cold state.

* * * * *